United States Patent [19]

Paulson et al.

[11] Patent Number: 5,270,929
[45] Date of Patent: Dec. 14, 1993

[54] RADIO WAVE REFRACTIVITY DEDUCED FROM LIDAR MEASUREMENTS

[75] Inventors: Merle R. Paulson; Herbert G. Hughes, both of San Diego, Calif.

[73] Assignee: The United States of America as represented by the Secretary of the Navy, Washington, D.C.

[21] Appl. No.: 636,512

[22] Filed: Dec. 31, 1990

[51] Int. Cl.$^5$ .................. G01W 1/10; G06F 15/54
[52] U.S. Cl. ........................ 364/420; 73/335.01; 356/342
[58] Field of Search ............ 356/337, 338, 342; 250/574, 575; 364/420, 551.01; 73/29.01, 335.01

[56] References Cited

U.S. PATENT DOCUMENTS

| | | | |
|---|---|---|---|
| 3,446,556 | 5/1969 | Collis | 356/5 |
| 3,688,189 | 8/1972 | Lamb | 356/5 |
| 3,725,914 | 4/1973 | Davidson et al. | 342/26 |
| 4,018,534 | 4/1977 | Thorn et al. | 250/575 |
| 4,093,918 | 6/1978 | Hitney | 364/524 |
| 4,125,893 | 11/1978 | Hitney et al. | 364/578 |
| 4,289,397 | 9/1981 | Itzkan et al. | 356/5 |
| 4,493,553 | 1/1985 | Korb et al. | 356/43 |
| 4,502,782 | 3/1985 | Werner et al. | 356/5 |
| 4,722,599 | 2/1988 | Fruengel et al. | 356/5 |
| 4,847,512 | 7/1989 | Seta | 250/575 |
| 5,075,856 | 12/1991 | Kneizys et al. | 364/420 |
| 5,140,523 | 8/1992 | Frankel et al. | 364/420 |

OTHER PUBLICATIONS

Pourny et al., "Raman-lidar humidity sounding of the atmospheric boundary-layer", Apr. 15, 1979, pp. 1141-1148.
W. J. Lentz, The Visioceilometer: A Portable Visibility and Cloud Ceiling Height Lidar, TR-0105, Jan. 1982.
Hughes, Herbert G. et al, Sensitivity of A Lidar Inversion Algorithm To Parameters Relating Atomospheric Backscatter and Extinction, 1 Jun. 1985, pp. 1609-1613.
Warren, Russell E., Effect of Pulse-Air Correlation On Differential Absorption Lidar, 1 Nov. 1985, pp. 3472-3480.
Salemink, H. W. M., Quantitative Lidar At 532NM For Vertical Extinction Profiles and the Effect of Relative Humidity, 13 Mar. 1984, pp. 187-189.
Grant, William B., Differential Absorption Lidar Signal Averaging, 15 May 1988, pp. 1934-1938.
Hughes, Herbert G. et al, Double-Ended Lidar Technique for Aerosol Studies, 1 Jun. 1988, pp. 2273-2278.
Effect of relative humidity on the aerosol backscattering coefficient at 0.694- and 10.6 m wavelengths by James W. Fitzgerald, 1 Feb. 1984, vol. 23, No. 3, Applied Optics.
Naval Ocean Systems Center, Technical Document 1342 Revision 2.0, Feb. 1990 "Engineer's Refractive Effects Prediction System (EREPS) Revision 2.0" by W. L. Patterson et al.

Primary Examiner—Roy N. Envall, Jr.
Assistant Examiner—Jennifer L. Hazard
Attorney, Agent, or Firm—Harvey Fendelman; Thomas G. Keough; Peter A. Lipovsky

[57] ABSTRACT

A high resolution lidar is used to backscatter light from atmospheric aerosols. The actual relative humidity is measured at altitudes corresponding to those from which the backscattered light occurs. A mathematical relationship between the two is then derived and this is used to predict atmospheric relative humidity from subsequent lidar backscatter s measurements. The predicted relative humidity is used with temperature and pressures derived from standard lapse rates to calculate the radio refractivity of the atmosphere. Radio ray coverage is then determined based upon the calculated radio refractivity.

26 Claims, 13 Drawing Sheets

RADIO WAVE REFRACTIVITY DEDUCED FROM LIDAR MEASUREMENTS

STATEMENT OF GOVERNMENT INTEREST the invention described herein may be manufactured and used by or for the Government of the United States of America for governmental purposes without the payment of any royalties thereon or therefor.

DOCUMENTS INCORPORATED BY REFERENCE

The following documents are hereby incorporated by reference into this specification:

U.S. Pat. No. 4,125,893 issued on Nov. 14, 1978 to Herbert V. Hitney; Juergen H. Richter and Murray H. Schefer titled "Integrated Refractive Effects Prediction System; Fitzgerald, James W., "Effect of Humidity on the Aerosol Backscattering Coefficient at 0.694- and 10.6-$\mu$m Wavelengths", printed in applied Optics, Feb. 1, 1984, vol. 23, No. 3, p. 411–418; Hitney, H. V., A. E. Barrios, and G. E. Lindem, "Engineer's Refractive Effects Prediction System (EREPS) Revision 2.0", NOSC Technical Document 1342, February 1990, Naval Ocean Systems Center, San Diego, Calif.; and Lentz, W. J., "The Visioceilometer: A Portable Visibility and Cloud Ceiling Height Lidar", ASL Technical Report 0105, 1982, Atmospheric Sciences Laboratory, White Sands Missile Range, N.M.

BACKGROUND OF THE INVENTION

1. Field of the Invention

This invention pertains to the calculation of the refractive index of the atmosphere and in particular to the use of a light detection and ranging (LIDAR) device to make such calculations.

2. Description of the Related Art

Knowledge of radio refractivity within the atmosphere is necessary to accurately predict electromagnetic radio propagation. For example, in radar applications it is widely known that gradients in the radio refractivity of the atmosphere can create ducts which guide radio propagation and holes in radio coverage through which objects may travel undetected. Plots that illustrate these radio refractivity characteristics are known as refractive index profiles.

In the past refractive index profiles have been assembled through the use of balloon radiosondes and aircraft-carried refractometers. These instruments provide accurate assessment of factors often used to judge radio refractivity such as relative humidity, temperature and pressure. Both of these methods, balloon radiosondes and aircraft-carried refractometers, are costly, time consuming and may be unsuitable in hostile environments.

Knowledge of relative humidity is essential to the accurate calculation of atmospheric radio refractivity. It is known that gradients, or changes in relative humidity, will produce gradients in the radio refractivity of the atmosphere. These gradients create the ducts and holes in radio propagation mentioned above.

In the past, light detection and ranging (lidar) instruments have been used to study atmospheric conditions, including relative humidity. Compared to radiosonde launchings or aircraft flights, using a lidar can be a much less costly, more time efficient and covert means by which characteristics of the atmosphere can be examined.

A lidar is an instrument that projects a laser light beam and that receives backscattered light returned from objects in the path of the projected beam. Lidars measure the time elapsed from light transmission to reception so that the range at which the projected light beam is backscattered can be determined.

The use of lidars to examine relative humidity has bee based upon the strong relationship between atmospheric backscattering and aerosols present within the atmosphere. As relative humidity increases, condensation of water vapor on the water-soluble aerosol particles causes their sizes and consequently their backscattering cross-sections to increase.

Techniques of using lidar instruments to assess atmospheric relative humidity have, however, resulted in relative humidity predictions that deviate substantially from actual measurements. This less-than-desirable result is chiefly due to an insufficient knowledge of the precise relationship between atmospheric conditions and aerosol characteristics. This has resulted in the making of erroneous assumptions such as those pertaining to atmospheric temperature, pressure, backscatter and extinction. Further exasperating these problems are inaccuracies in lidar measurements, such as those due to lidar readings taken at too large of altitude intervals.

As a result of these shortcomings, lidar-deduced relative humidity measurements have not been considered for radio refractivity calculations.

SUMMARY OF THE INVENTION

The invention provides a relatively inexpensive, time efficient and covert mechanism by which atmospheric radio refractivity may be deduced by lidar measurements. Through use of the invention, gradients in radio refractivity may be accurately pinpointed.

The invention incorporates the use of a pulsed laser lidar that has a relatively rapid light reception sampling frequency, enabling high resolution (small altitude interval) relative humidity measurements to be made. Contrary to previous attempts to assess relative humidity from lidar measurements, use of the invention permits relative humidity to be predicted directly from the lidar return-signals, with temperature and pressure factors being derived from standard temperature and pressure lapse rates referenced to surface conditions. Precise determination of atmospheric backscattering and extinction characteristics, or even the relationship between the two is not a requirement of this invention.

In the invention, lidar return-signals, indicating the amount of light backscattered from atmospheric aerosols due to the projecting of a light beam from the lidar, are first recorded. The ranges and altitudes at which the backscattered light occurs is then determined.

The lidar calculates range directly by measuring the time elapsed from light transmission to reception. Determination of altitude is dependent upon the orientation of the lidar. When the lidar is employed to project a beam substantially vertically, the altitude will substantially equal the range at which the backscattering occurs. When the lidar is used to project a beam other than vertically, the altitude at which the backscattering occurs can be determined by conventional trigonometric techniques.

The signal-strength of each of the lidar return-signals is I then adjusted to compensate for range-induced losses, converting the signals into range-compensated return-signals. Actual relative humidity is then measured at the altitudes corresponding to the range-compensated return-signals and a mathematical relationship is derived from the range-compensated return-signals for each calculated altitude and the actual relative humidity measured at corresponding altitudes. In a preferred embodiment of the invention this mathematical relationship is derived using the method of least squares.

Once this mathematical relationship is derived, radio refractivity is then predicted by projecting a subsequent lidar beam into the atmosphere. The backscattered light from this subsequent beam is then received by the lidar and the ranges and altitudes at which this beam is backscattered are calculated. The received backscattered light is converted into additional return-signals, and these signals are then range compensated adjusted These additional range-compensated return-signals are then used in the earlier derived mathematical relationship to predict the relative humidity that exists at the altitudes corresponding to these signals. For each of the altitudes corresponding to the additional range-compensated return-signals, radio refractivity is calculated by using the predicted relative humidity, and temperatures and pressures calculated from standard temperature and pressure lapse rates reference to surface conditions.

In this approach no relationship between atmospheric backscatter and extinction need be made. Nor are any measurements of actual extinction, temperature and pressure required other than those at surface levels. By using such an approach a good correspondence between calculated radio refractivity and that deduced from actual measurements can be obtained. It has been found that through use of the invention, gradients in relative humidity could be accurately predicted, and hence gradients in radio refractivity calculated through use of the invention correspond very closely with those measured by airborne instruments. Accurate prediction of radio wave duct and hole position is thus possible.

OBJECTS OF THE INVENTION

It is an object of the invention to provide an improved method for predicting relative humidity.

Yet another object of the invention is to provide a method for predicting relative humidity that provides an accurate assessment of gradients in relative humidity.

Another object of the invention is to provide a relatively low cost, time efficient and covert method for calculating relative humidity.

Still yet another object of the invention to provide an improved method for calculating radio refractivity.

Yet another object of the invention is to provide a relatively low cost, time efficient and covert method for calculating radio refractivity.

A further object of the invention is to provide a method for calculating radio refractivity that provides an accurate assessment of gradients in radio refractivity.

These and other objects of the invention will become more apparent from the ensuing specification when considered together with the drawings.

BRIEF DESCRIPTION OF THE DRAWINGS

FIGS. 8A and 8B are radio-ray signal coverage predictions for a temperature inversion near 600 meters altitude occurring on Sep. 12, 1989. FIG. 8A has been computed from radiosonde data with FIG. 8B being computed from lidar data.

FIGS. 9A and 9B are radio-ray signal coverage predictions for a temperature inversion near 200 meters altitude occurring on Sep. 20, 1989. FIG. 9A corresponds to radiosonde data with FIG. 9B corresponding to lidar data.

DESCRIPTION OF THE PREFERRED EMBODIMENT

Figure 1:
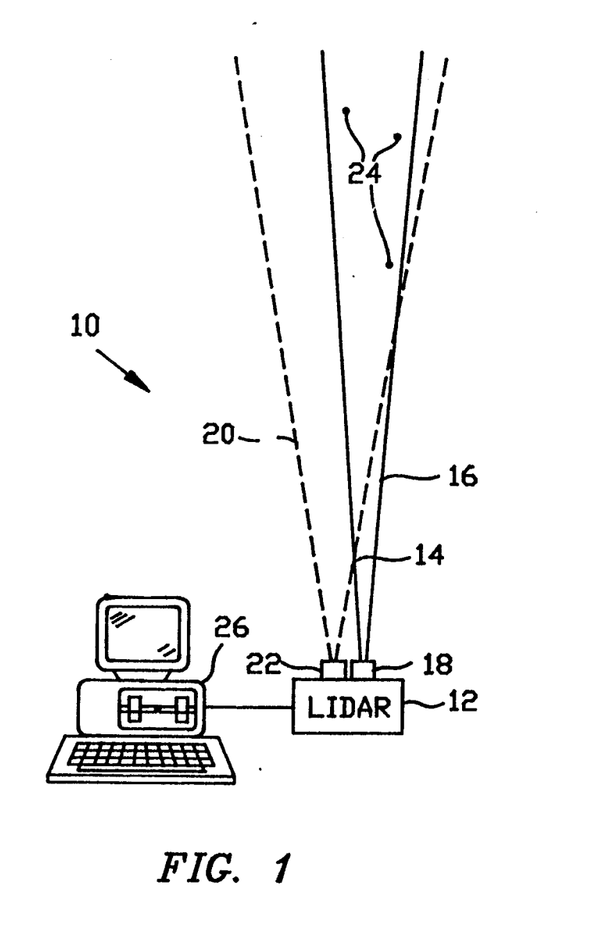
FIG. 1 is a diagrammatic illustration of a computer controlled lidar system 10 according to a preferred embodiment of the invention.

In FIG. 1 there is shown a computer control lidar system 10 according to a preferred embodiment of the invention. In the actual implementation of the invention a light detection and ranging (LIDAR) device 12 known as a visioceilometer was used. The lidar visioceilometer has been developed by the United States Army from a modified AN/GVS-5 Nd:YAG laser range finder. The pulse laser of lidar 12 operates at 1.06 micrometers with a nominal pulse energy of 13 milliJoules. Lidar 12 has a pulse half-width of 6 nanoseconds with a receiver sampling rate of 20 mega-Hertz. Such a sampling rate provides a backscatter light sample recording for every 7.5 meters of altitude above crossover point 14 of FIG. 1. Crossover point 14, in the implementation of the invention shown, existed at about 100 meters altitude and is the point at which light beam 16 of laser 18 crosses over field of view 20 of lidar receiver 22. In Table 1 there are listed the characteristics of the specific lidar used offered by way of example. These characteristics were compiled by W. J. Lentz referred to earlier in this specification.

TABLE 1

| Characteristics of the Visioceilometer Lidar | |
|---|---|
| Beam divergence | 1.0 mrad |
| Receiver field of view | 3.0 mrad |
| Laser energy | 13 mJ at 1.06 μm |
| Pulse half-width | 6 ns |
| Receiver aperture | 50 mm |
| Laser exit diameter | 16 mm |
| Optics axis separation | 50 mm |
| Full crossover range | 80 m |
| Log A slope | 10 mV/dB |
| Log A zero | 80 μV |
| Detector noise level | $2 \times 10^{-10}$ W |
| Laser monitor output | 0.75 ± 0.25 V |
| Sample rate | 20 MHz |
| A/D converter | 10 bits in 2 μs |
| Sample device | 455-sample dual-channel CCD (Fairchild #CCD 321) |

TABLE 1-continued

Characteristics of the Visioceilometer Lidar

| | |
|---|---|
| Operating temperature | −5° to 60° C. (prototype) |
| Sample range | 3.3 km |

It should be noted that the lidar described here is offered by way of example and that other light beam transmitting and receiving devices may be used in the invention It should also be noted that in order to calculate radio refractivity of useful resolution, a lidar or equivalent system should have a relatively high order sample rate so that backscattered light may be collected at sufficiently small altitude intervals. In the lidar illustrated by way of example, a sample rate of 20 MHz proved to be sufficient for accurate radio refractivity calculations One skilled in the art will realize, however, that even higher sampling rates will enhance refractivity calculation accuracy.

Referring once again to FIG. 1, lidar 12 of system 10 is used to project concentrated light beam 16 upwardly into the atmosphere and onto suspended aerosol particles 24. Particles 24 lie at various locations in the atmosphere and depending on the size of these particles they may appear invisible to the eye or may take the form of haze, fog, clouds or the like.

Some of light beam 16 will be reflected or backscattered by aerosol particles 24 with the remainder of the beam continuing upward. In the illustration shown, aerosol particles 24 backscatter light beam 16 and this backscattered light is received by lidar receiver 22, providing that the backscattered light falls within receiver field of view 20.

As previously described, receiver 22 of lidar 12 operates at 20 MHz so that a "snapshot" of the backscattered light is taken every 1/20 MHz. This provides a high resolution profile of the returning light in 7.5 meter altitude graduations. In order to measure the range at which the backscattered light is returned, lidar 12 includes time measuring capability that notes the elapsed time from the projection of light beam 16 to the reception of backscattered light from aerosol particles 24. In cases in which lidar 12 is used to project a beam substantially vertically the range and altitude from which light beam 16 is backscattered will be one and the same. In those cases in which lidar beam 16 is projected other than substantially vertically, such as for slant range measurements, lidar 12 will provide the range to the backscattering particles, and the altitude of the particles is calculated by traditional techniques.

The backscattered light collected by receiver 22 of lidar 12 is converted into return-signals according to the energy intensity of the light received Computer 26 can be designed to include electrical signal processors that adjust the signal strength of the returned-signals to compensate for range induced signal losses. The return-signals from lidar 12 will thereby be converted into range-compensated return-signals.

In a preferred embodiment of the invention computer 26 will control the firing of lidar 12's light beam 16 and will read and process the data provided by lidar 12. Computer 26 should be programmed to provide for input of ground-based measurements such as temperature, pressure and relative humidity. These could be used as starting points for standard lapse-rate curves of temperature and pressure. In addition, computer 26 should be programmed to calculate ground-based radio refractivity.

Computer 26 should also provide a graphic display of range-compensated return-signals, radio refractivity profiles provided from the lidar-collected data and predicted radio-ray signal coverage. Radio-ray or ray-trace computer programs suitable for this application are readily available, one such program being known as the Engineer's Refractive Effects Prediction System (EREPS) described in U.S. Pat. No. 4,125,893 incorporated by reference herein.

Through the course of experimentation leading to the invention it was determined that lidar-collected data could be used to predict the presence or absence of relative humidity gradients and hence radio refractivity conditions. The remaining figures illustrate the basis for this conviction.

Figure 2:
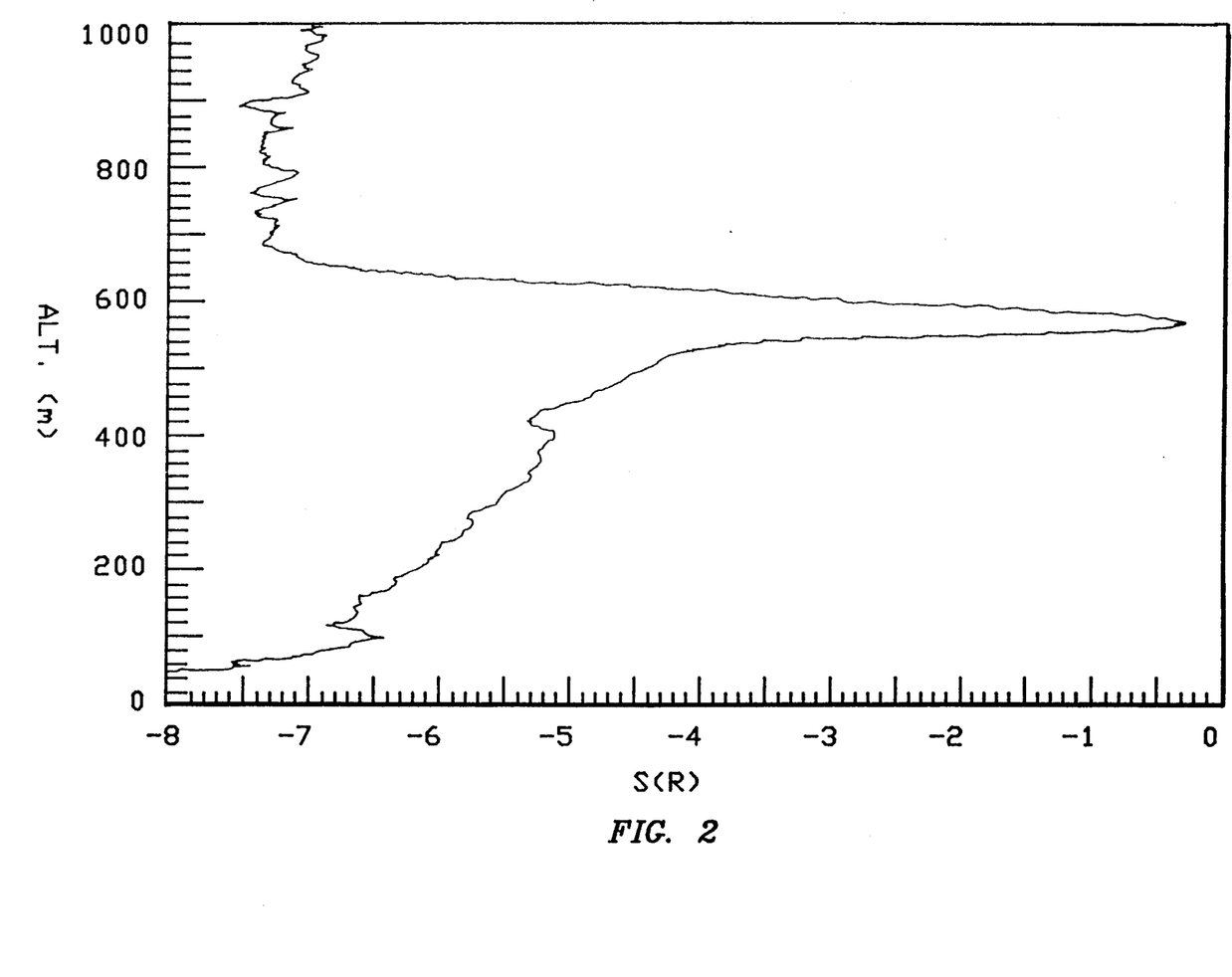
FIG. 2 is an example of range-compensated lidar return-signals from a cloud and plotted with respect to altitude.
Figure 3:
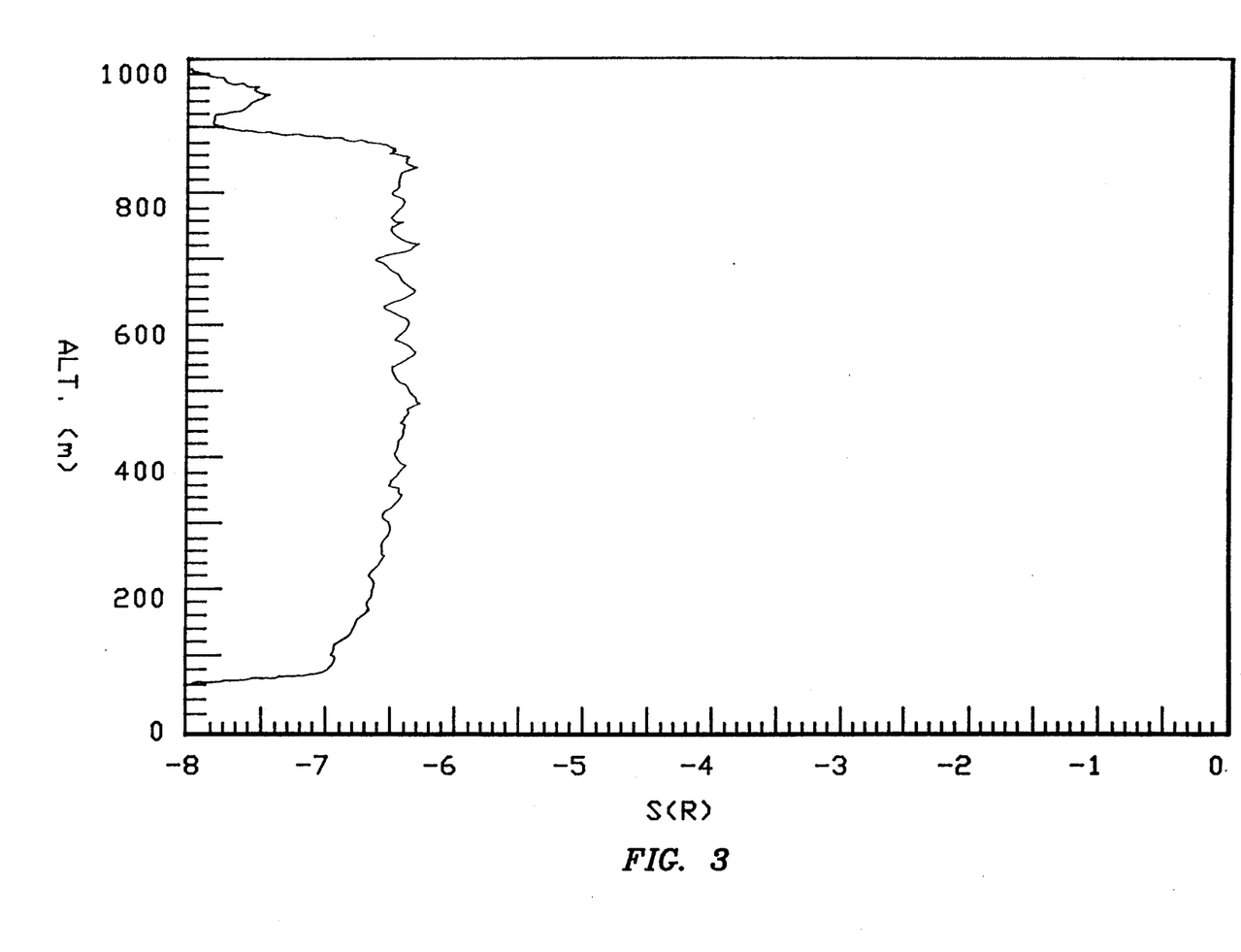
FIG. 3 is an example of range-compensated return-signals from an inversion and plotted with respect to altitude.
Figure 4A:
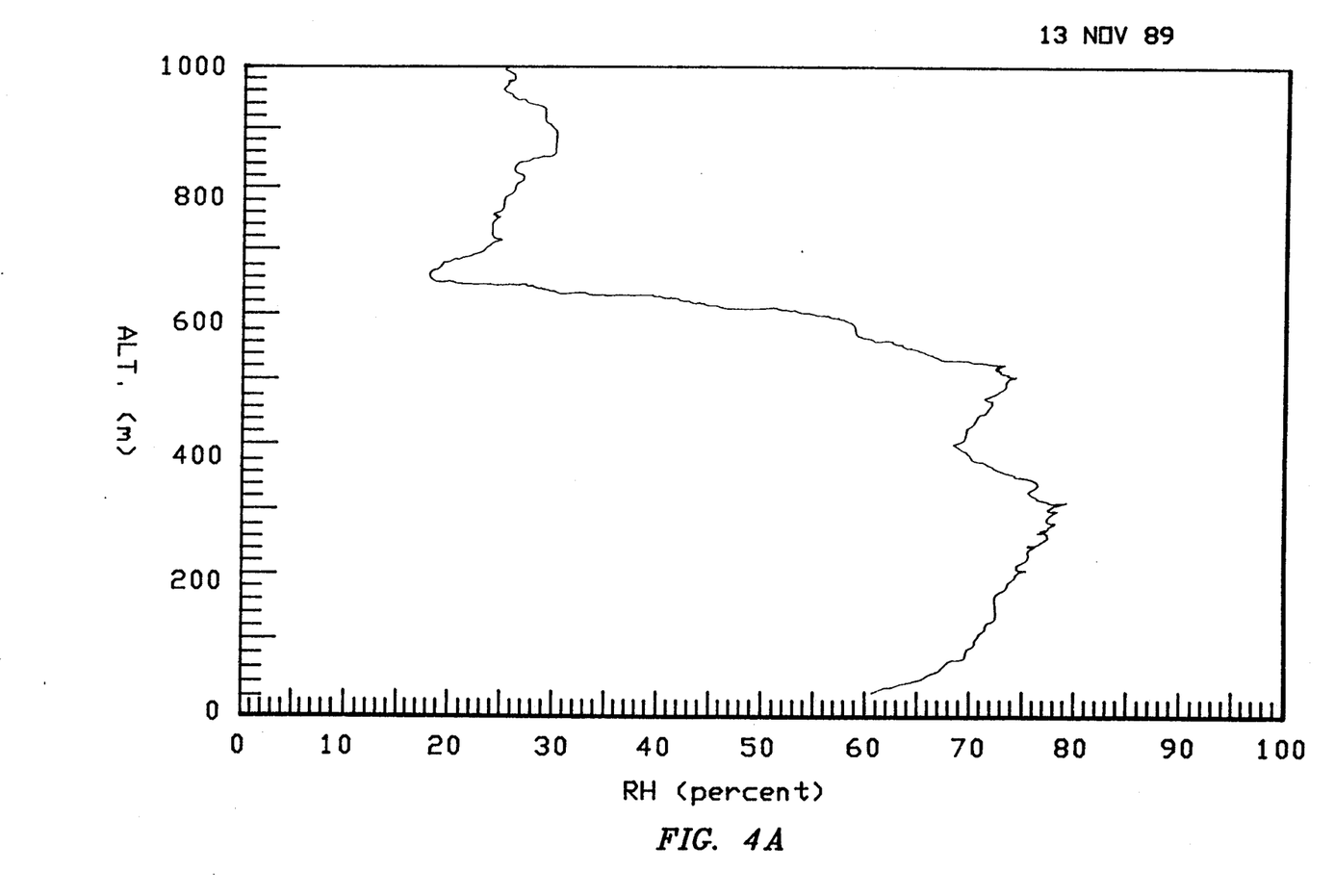
FIG. 4A is a plot of actual relative humidity recorded with respect to altitude.
Figure 4B:
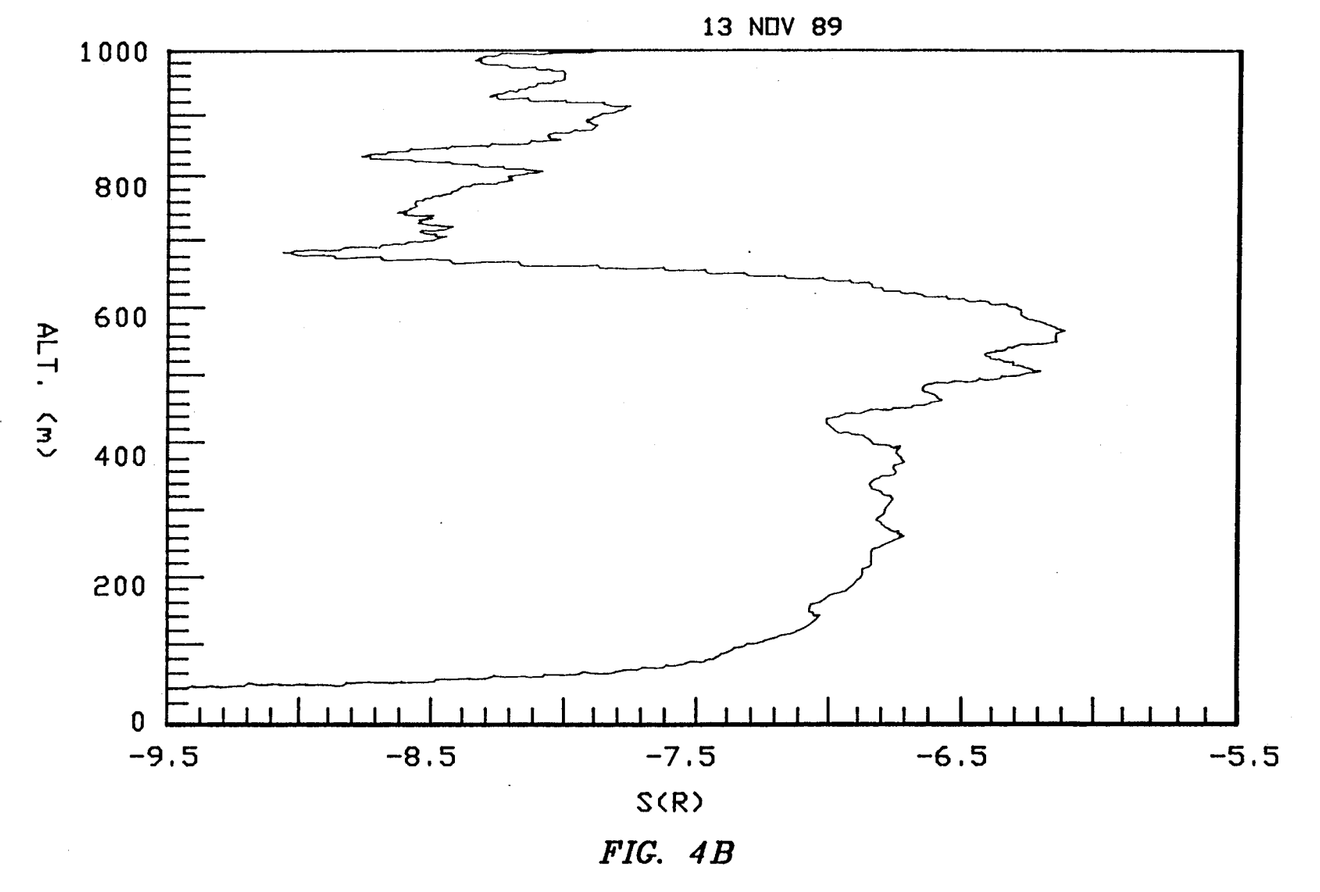
FIG. 4B is a plot of range-corrected lidar return-signals with respect to altitude and taken at the same time as the data of FIG. 4A.

Referring to FIG. 2 when lidar 12 is used to project light beam 16 substantially vertically within the presence of a cloud layer a profile of the range-compensated backscattered returned-signal, S(R), shows a rapid increase in S(R) near the approximately 500 m base of the cloud. This is considered a result of an increase in backscattered light from water-bearing aerosol particles within the cloud. A rapid decrease in range-compensated return-signals follow as the projected light beam penetrates the cloud and is attenuated Referring now to FIG. 3, when a temperature inversion exists, and if no clouds are present, the range-compensated lidar return-signals S(R) show a very rapid decrease at the 900 meter height of the inversion. This is considered to result from a decrease in the backscattered range-compensated return-signal above the inversion, rather than from an increased in atmospheric extinction. The decrease in backscattered range-compensated return-signals corresponds to, and results from, a decrease in relative humidity through the temperature inversion. An example further illustrating this is shown in FIGS. 4A and 4B which are comparisons of relative humidity (RH) versus altitude with range-compensated return-signals (SR) versus altitude measured on the same day.

In order to predict radio refractivity and hence the presence or absence of refractivity ducting conditions a correlation between atmospheric relative humidity and range-compensated lidar return-signals was sought. In order to make this correlation the method of the invention was devised.

Referring once again to FIG. 1, the previously described lidar was set up upon the southern tip of the Point Loma peninsula in San Diego, Calif. This site is about 30 meters above sea level. The light beam of the lidar was projected in the vertical direction a number of times and a group of five or six profiles of lidar return-signals were received and recorded.

Note that a large number of collections or profiles of lidar returns were made during this experimentation so that a large statistical base could be assembled. This should not be interpreted to mean that a number of lidar projections are required in all cases, as even a single projection may suffice.

The lidar was used to calculate the ranges from which the light beam backscattering occurred As these beams were projected substantially vertically, the ranges calculated equalled the altitudes of the backscattering aerosol particles. At roughly the same time as the lidar measurements, a balloonborne radiosonde was launched and temperature, pressure and relative humidity were recorded as functions of time and hence altitude as the balloon rose. Lidar and radiosonde measurements were then made on an irregular basis, starting on Sep. 12, 1989 and ending Nov. 21, 1989. Usually only one balloon radiosonde was launched on any given day. The dates of these measurements were recorded and are shown among other things in Table 2.

TABLE 2

Least-squares curve fit to a straight line for relative humidity (Rh) as a function of lidar S(R) return.
Curve is Rh = A + B * S(R).

| Date | A | B | Correlation | Maximum Altitude (m) |
|---|---|---|---|---|
| 09/12/89 | 241.481 | 28.390 | 0.9477 | 1170 |
| 09/13/89 | 178.081 | 20.755 | 0.9243 | 728 |
| 09/18/89 | 218.973 | 21.564 | 0.7225 | 660 |
| 09/20/89 | 226.310 | 22.770 | 0.9305 | 608 |
| 09/26/89 | 270.510 | 34.270 | 0.9477 | 690 |
| 09/27/89 | 305.381 | 35.382 | 0.9613 | 1050 |
| 09/28/89 | 304.918 | 34.061 | 0.9315 | 420 |
| 09/29/89 | 186.333 | 17.823 | 0.8232 | 705 |
| 10/02/89 | 234.921 | 25.084 | 0.9417 | 1343 |
| 10/03/89 | 328.397 | 42.097 | 0.9733 | 1050 |
| 10/24/89 | 161.510 | 12.123 | 0.9452 | 600 |
| 11/13/89 | 219.892 | 22.416 | 0.7199 | 750 |
| 11/21/89 | 378.925 | 48.379 | 0.8534 | 1100 |

LIDAR DATA PROCESSING

The lidar return-signals were adjusted in-light-of lidar calibration data. The calibration data were assembled by exposing the lidar receiver to a light source of known intensity. After calibration, the return-signals were adjusted to compensate for the range-square loss due to distance. This provided a profile of range-compensation return-signals, S(R), as a function of altitude.

The S(R) data were then used in a comparison with the radiosonde relative humidity data collected at altitudes corresponding approximately to those altitudes of the S(R) data. For each particular range-compensated return-signal corresponding to a certain altitude, averaging was done with those range-compensated return-signals calculated at four altitudes intervals above and below the particular signal This averaging was done because the lidar return-signals frequently showed small-scale irregularities that the radiosonde measurements did not. The radiosondes did not detect these irregularities because of their longer sensor response time.

It should be noted that during the course of these measurements, the lidar return-signals for 100 meters altitude and below showed a rapid decrease, see FIGS. 1 and 2. This occurred because the lidar light beam below this altitude is not completely within the field of view of the lidar receiver. This 100-meter crossover point is shown in FIG. 1 as "14". Similarly, above certain altitudes the lidar return-signals approached background noise level. These altitudes depended upon atmospheric conditions and ranged from about 600 meters to 1100 meters on various days.

RADIOSONDE DATA PROCESSING

The radiosondes provided a record of temperature, pressure and relative humidity as a function of time. These data were used to calculate the altitudes of the measurements as well as the refractivity existing at the calculated altitudes. Profiles of relative humidity versus altitude, temperature versus altitude, and modified refractivity units (M-units) versus altitude were then generated from these data.

LIDAR (SR) PROFILES vs RELATIVE HUMIDITY PROFILES

Figure 5:
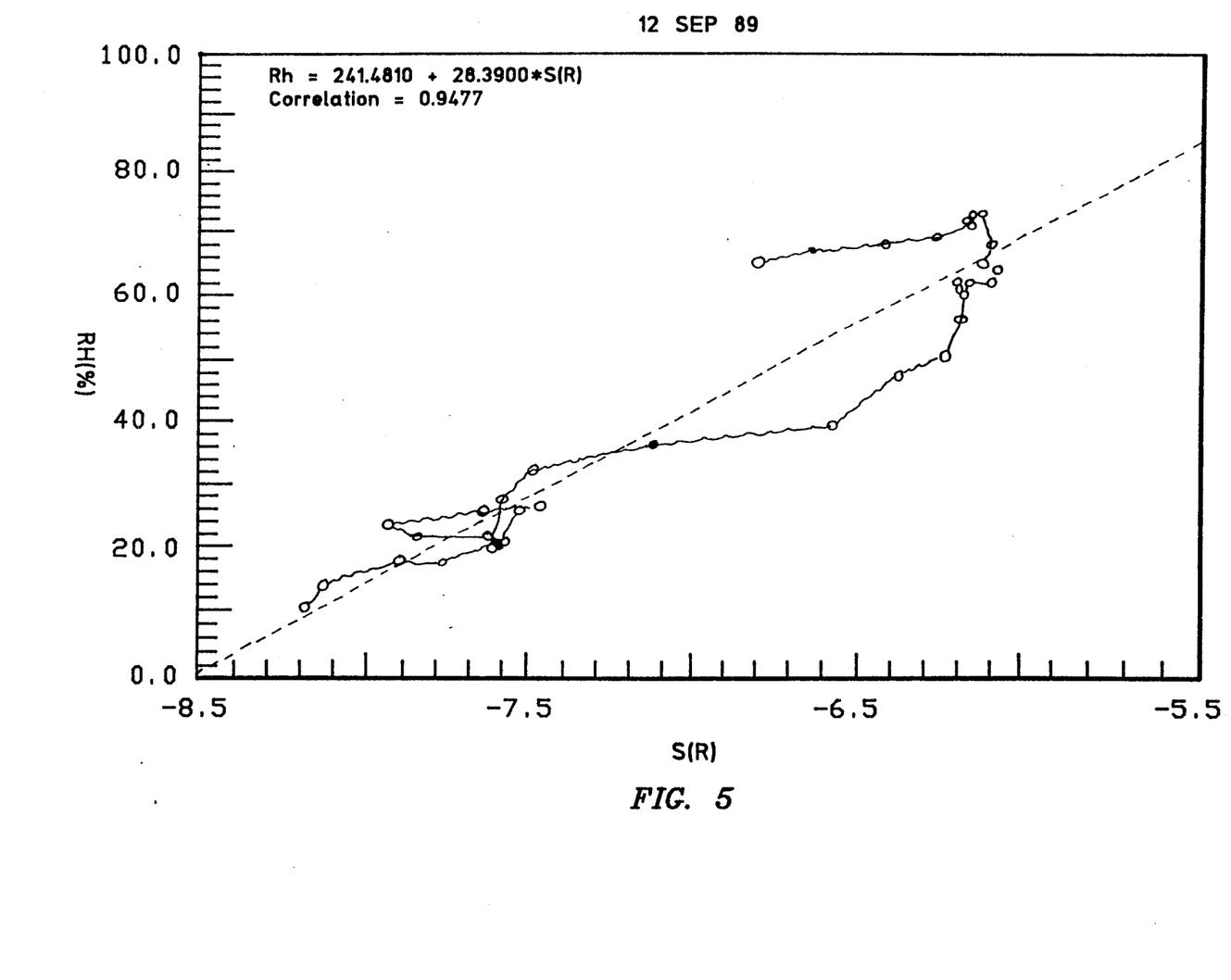
FIG. 5 is a plot of actual relative humidity as a function of range-compensated lidar return-signals.

The range-compensated lidar return-signals were provided for every 7.5 meters of altitude. These S(R) values were plotted on a horizontal axis for each altitude corresponding to the value, with actual measured relative humidity for this same altitude being plotted on a vertical axis.

FIG. 5 is an example of such a plot.

A least-squares fit to a straight line was then calculated for each of the S(R) values versus actual relative humidity plots Staticians will realize that other statistical methods could be used. Table 2 is a list of the least square fit values in which the curve is Rh=A+B*S(R). In Table 2 the maximum altitude calculated at which backscattered light occurred is shown. Also shown is the correlation between the actual relative humidity measurements as a function of the lidar range-compensated return-signals S(R). The results show a good correlation between actual relative humidity and the range-compensated lidar return-signals for each day of measurement. However, it should be noted that a curve fit for one day may be quite different from another day, this most likely attributable to the composition or makeup of the atmospheric aerosols varying with time and direction of wind.

It should also be noted that while the lidar-measured data were essentially snapshots of conditions at any particular moment, the balloon-borne radiosonde rose gradually at approximately 200 meters per minute In addition, rather than taking a vertical course like the light beam of the lidar, a strong wind caused the radiosondes to drift rapidly, usually southeast over land during its rise These factors could have resulted in the lidar and radiosondes seeing somewhat different atmospheric conditions.

Figure 6:
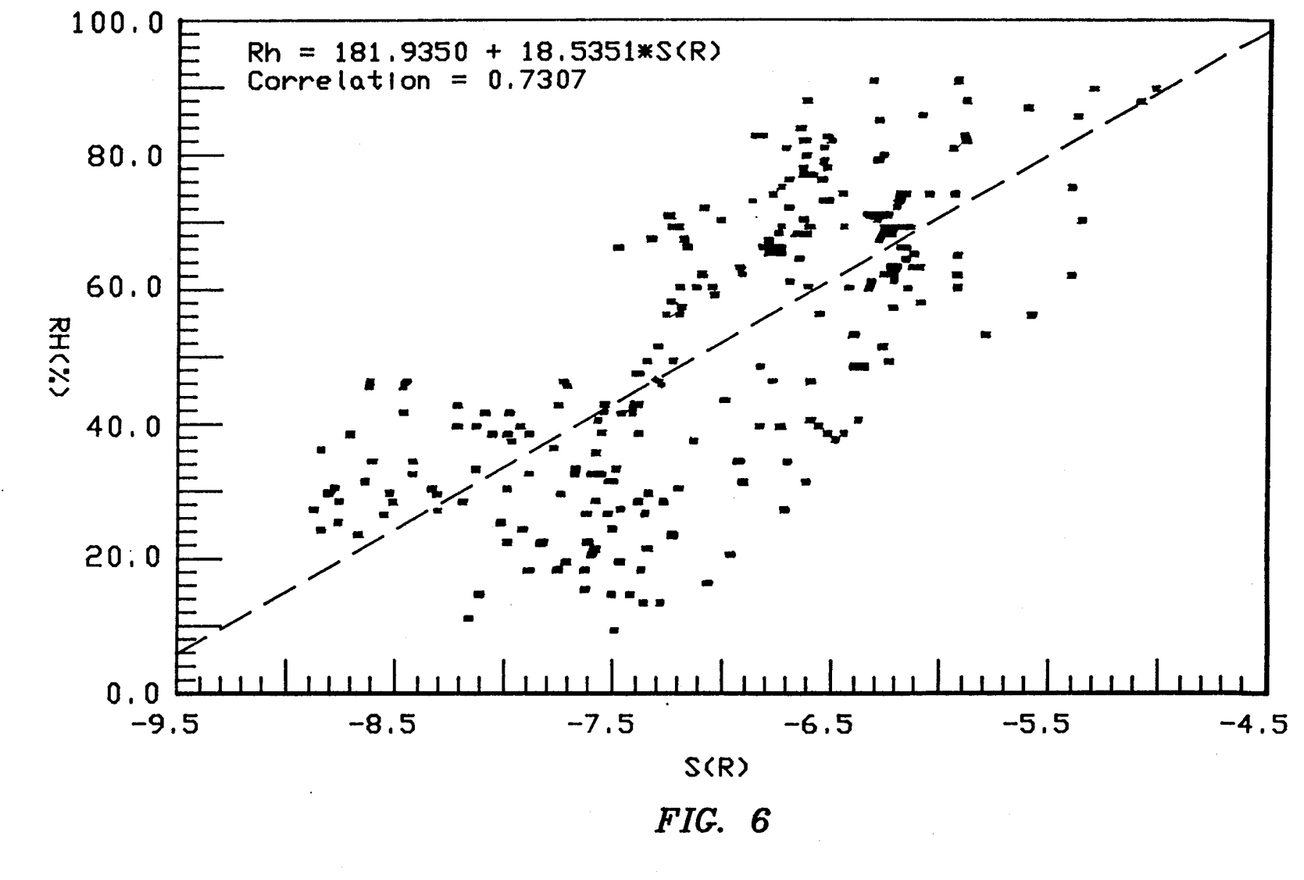
FIG. 6 shows actual relative humidity plotted as a function of range-compensated lidar return-signals for data samples collected over a number of days.

In FIG. 6 all of the lidar-collected and radiosonde-collected data have been plotted on one graph to portray the extent of this variability. A least-squares fit to a straight line was calculated for these data.

LIDAR M-UNIT PROFILES vs RADIOSONDE M-UNIT PROFILES

The equation of this line, from the actual relative humidity measurements and the lidar range-compensated return-signals, was then used to calculate predicted relative humidity from the lidar measurements made for each of the test days. Radio refractivity corresponding to the altitudes of the previously made lidar measurements was then calculated by using the predicted relative humidity with temperature and pressure calculated through standard-lapse rates referenced to surface measurements made for each of the test days.

The previously made lidar measurements were used so that a comparison between radio refractivity based upon predicted relative humidity and those based upon relative humidity measured by radiosonde could be made.

In the ordinary use of the invention however, the lidar would be used again to project a subsequent light beam into the atmosphere ultimately resulting in additional range-compensated return-signals. The relative humidity would then be predicted for each of the altitudes corresponding to these additional range-compensated return-signals and radio refractivity would be calculated based upon the relative humidity predicted at the altitudes corresponding to the additional range-compensated return-signals as well as from temperatures and pressures calculated as previously described.

Figure 7A:
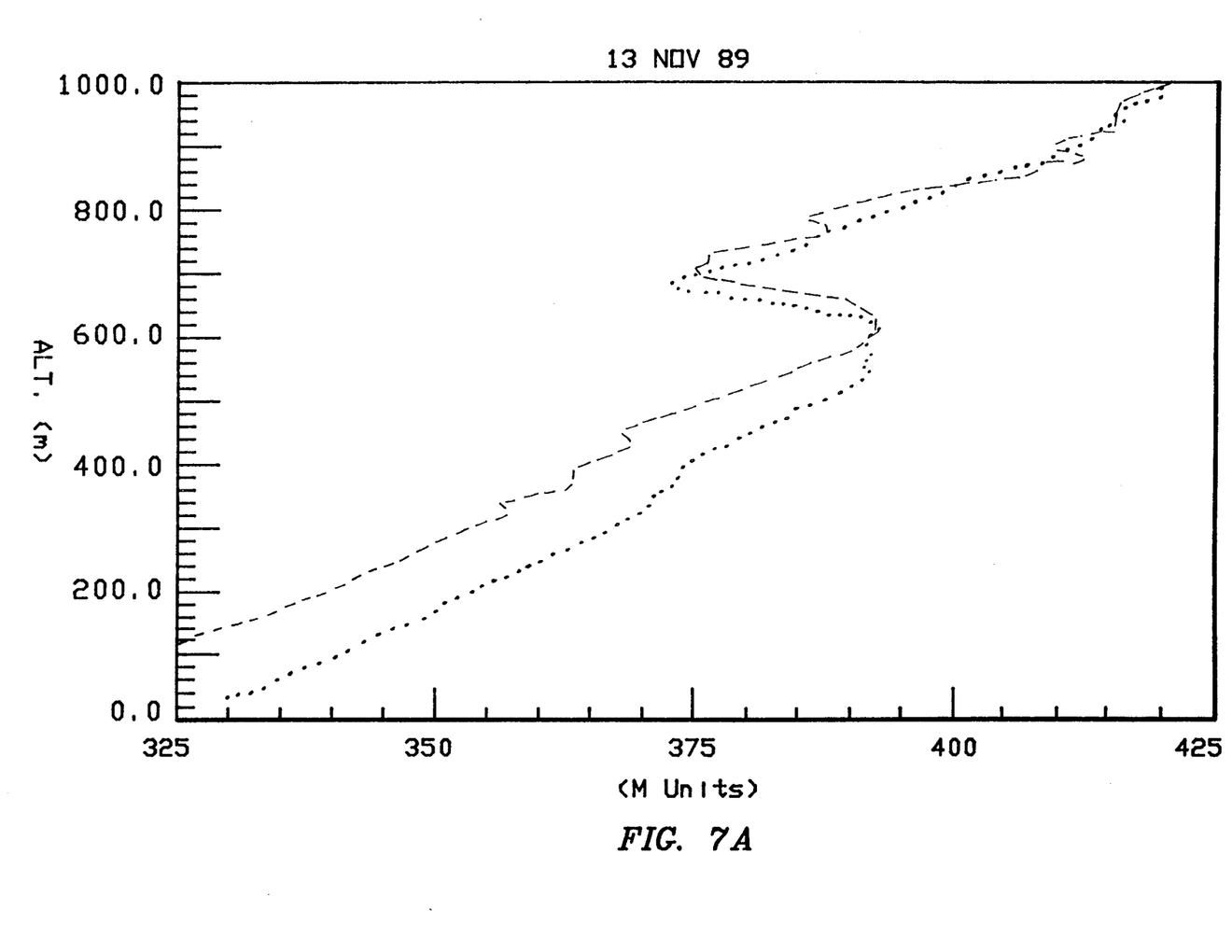
FIG. 7A and FIG. 7B show two examples of comparisons of modified radio refractivity (M-unit) profiles calculated from data collected by lidar and from data collected by radiosonde. The dashed lines correspond to lidar based calculations.
Figure 7B:
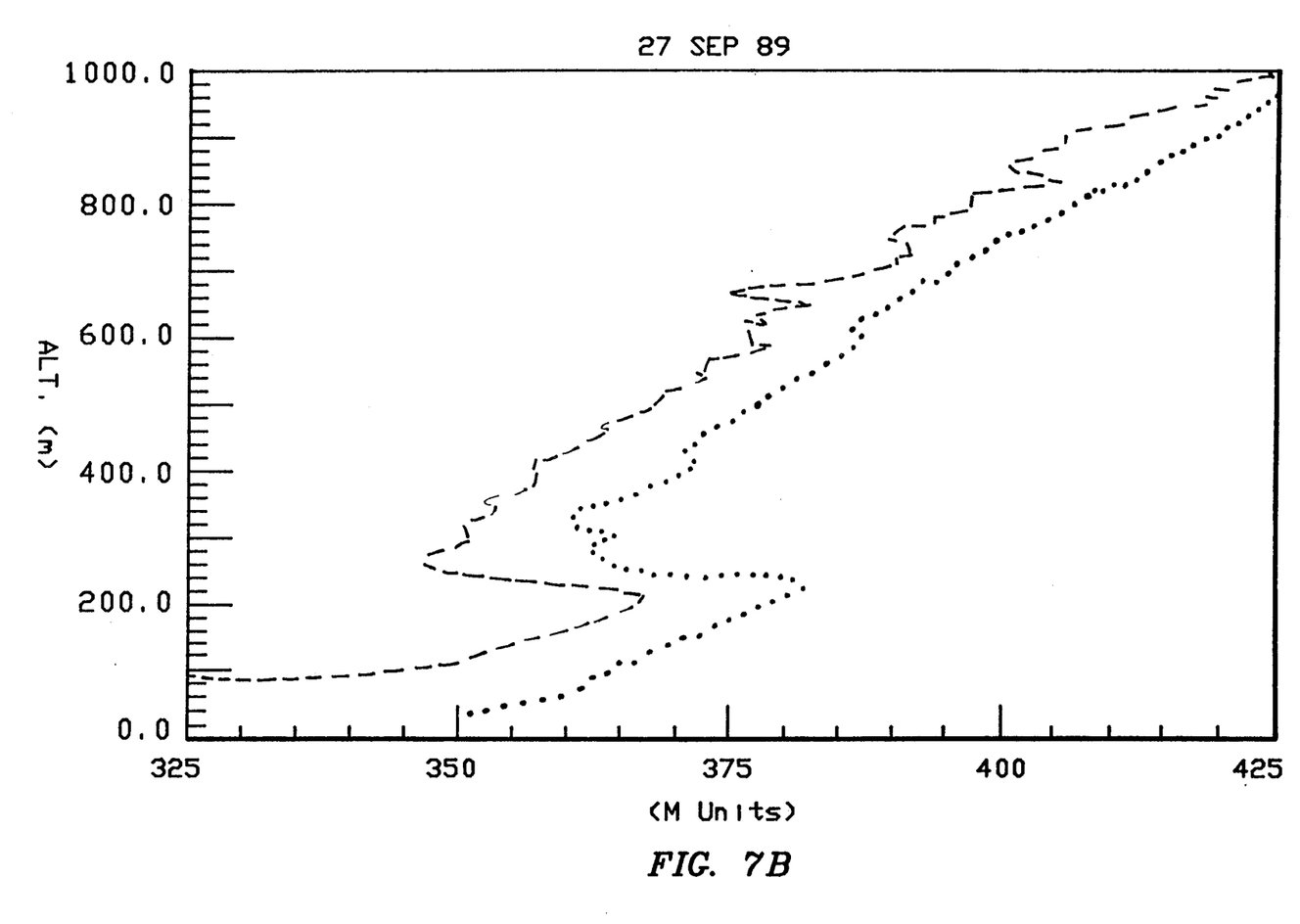

In FIGS. 7A and 7B a comparison of the radio refractivity profiles calculated from the radiosonde data is made to corresponding profiles calculated from the earlier collected lidar data. In these figures the dotted lines correspond to the radiosonde-collected data, with the dashed lines corresponding to the lidar measurements.

Figure 8A:
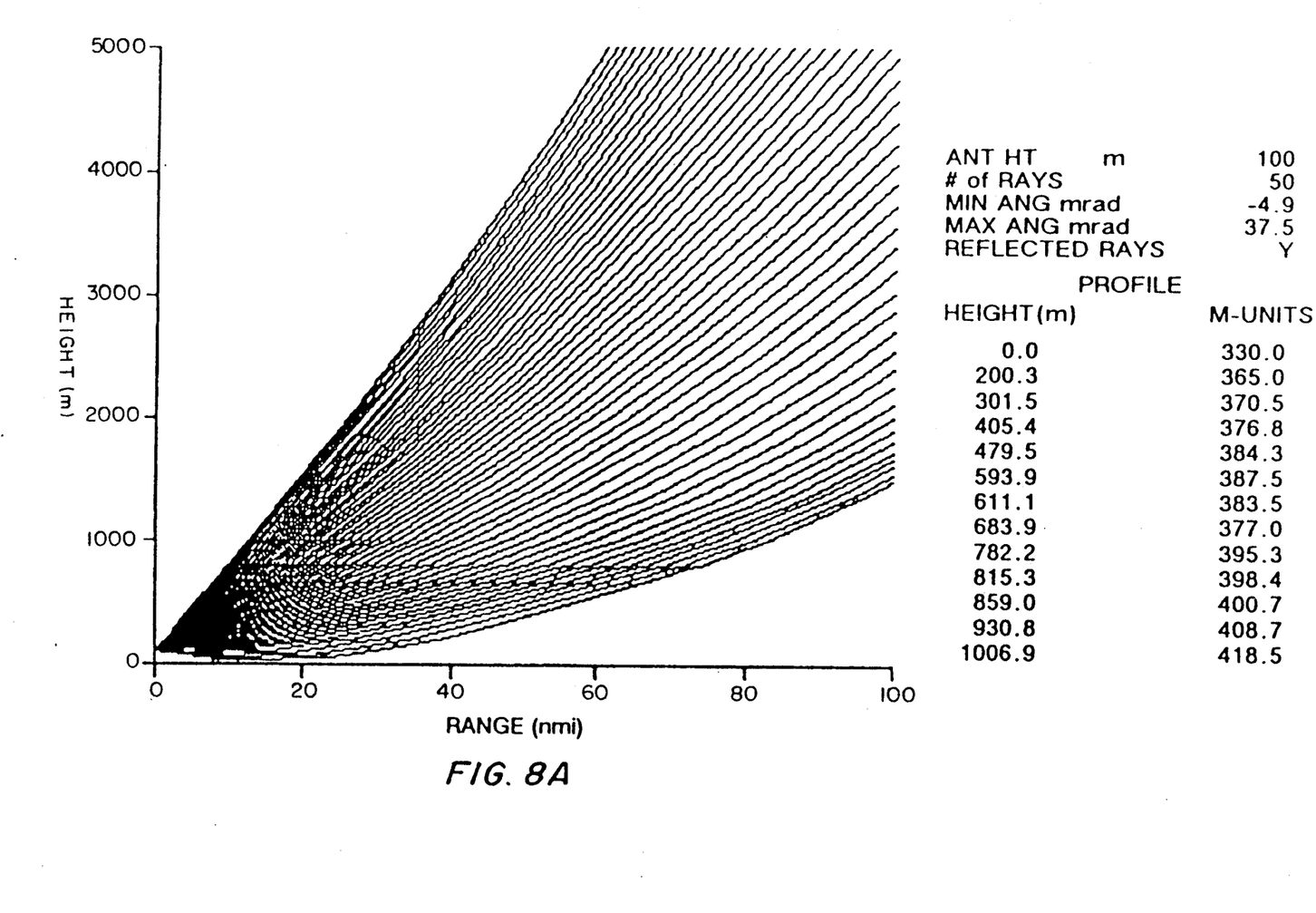
Figure 8B:
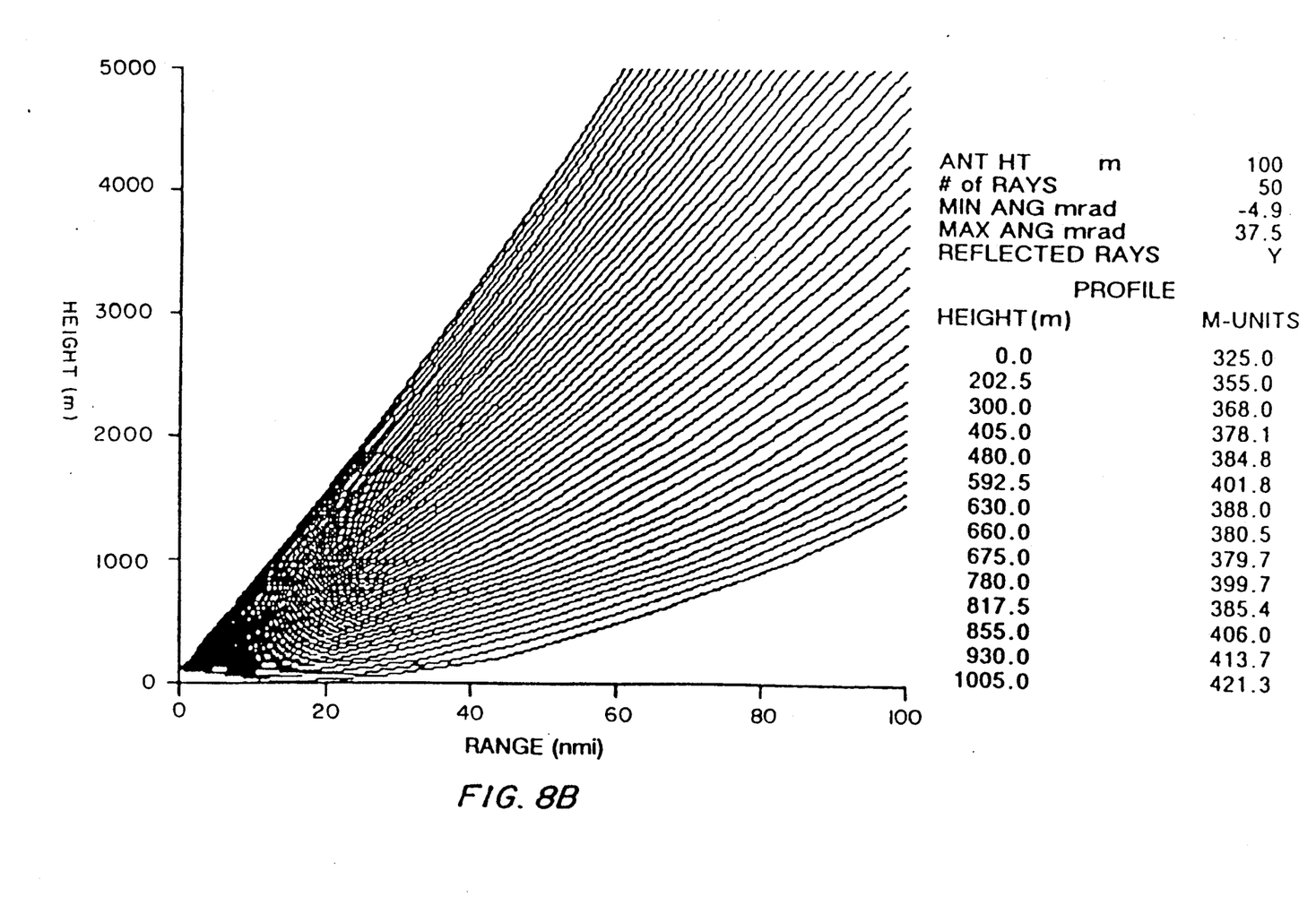
Figure 9A:
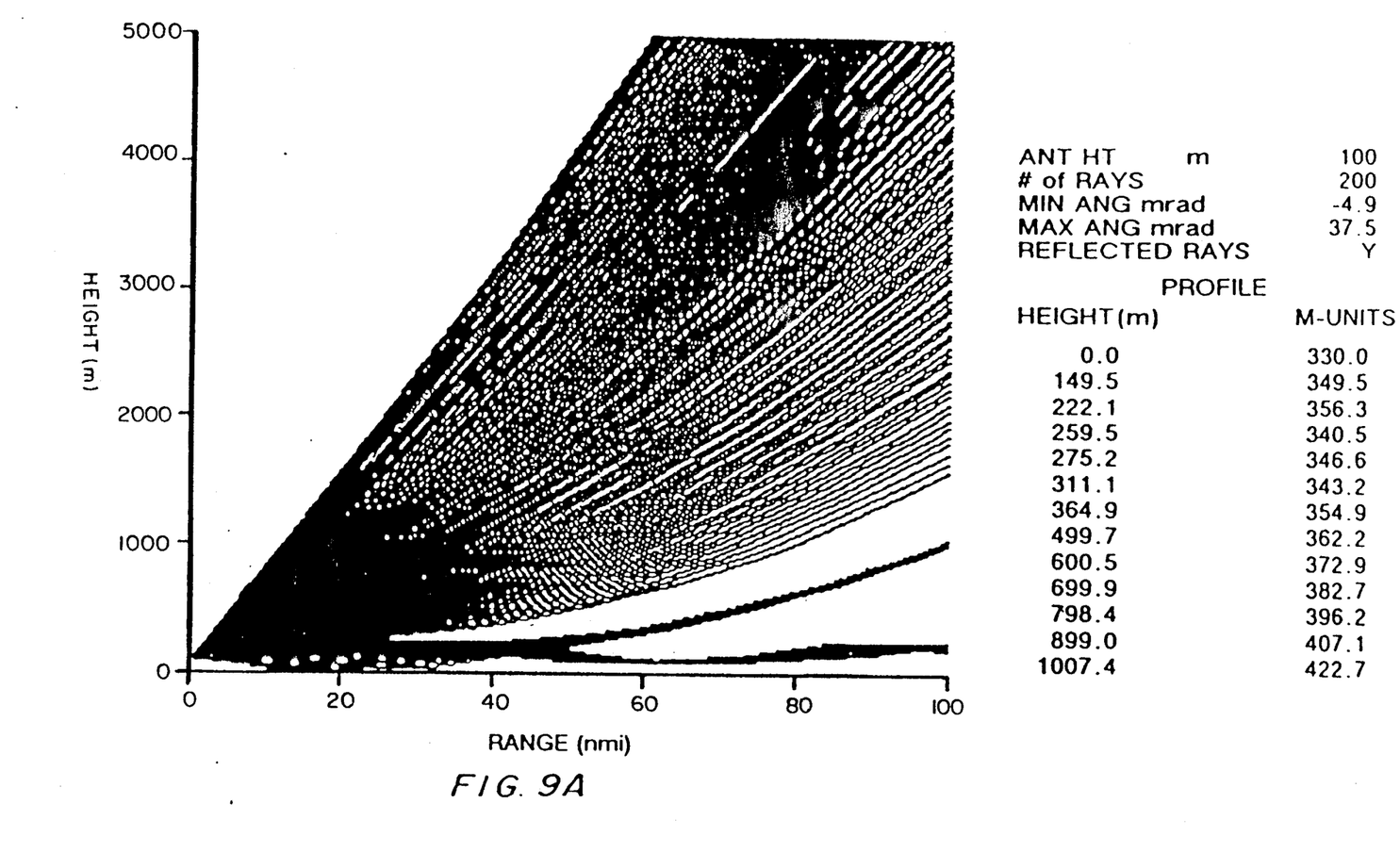
Figure 9B:
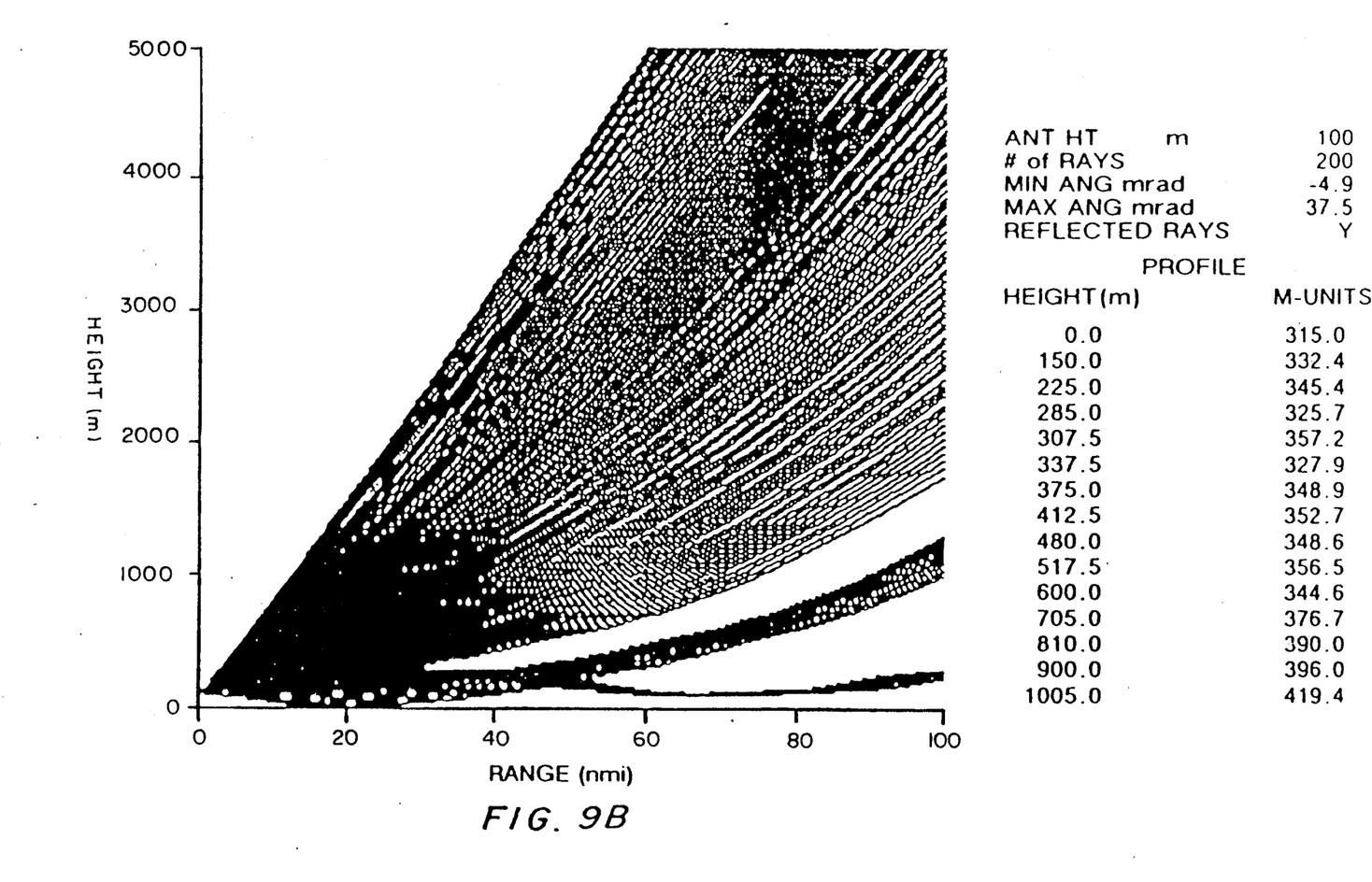

The Ray-trace computer program described in U.S. Pat. No. 4,125,893 previously referred to, was then used to calculate and plot radio signal coverage for the radiosonde refractivity profiles and for the lidar refractivity profiles. FIGS. 8A and 8B show two of these made from data collected on Sep. 12, 1989 when a temperature inversion near 600 meters altitude existed. FIG. 8A corresponds to radiosonde collected data with FIG. 8B being from the lidar collected data. FIGS. 9A and 9B are similar but are made from data collected on Sep. 20, 1989, when an inversion existed at 200 meters altitude The plots show closely similar ducting conditions.

Radio refractivity profiles calculated with the use of lidar-measured data show quite good agreement with those calculated from radiosonde-measured data. Some of the differences observed may have been caused by the radiosonde encountering changing atmospheric conditions as it drifted horizontally and rose. In addition, day-to-day changes in the composition of the atmospheric aerosols can cause some variability in the relationship between the lidar-collected data and the actual relative humidity profiles. The calculations of radio refractivity profiles, however, do not appear to be very sensitive to these differences. The strong gradients that occur at inversion levels, in both the lidar-measured returns and the actual relative humidity profiles, appear to be the controlling factors in calculating atmospheric ducting and radio-ray coverage.

Though there are obviously many modifications and variations of this invention, it should be noted that the lidar described was not optimum for the purpose of the invention. It is suggested that an "eye-safe" lidar should be used and that this lidar should have a minimum crossover point somewhat less than the 80 to 100 meters of the previously described lidar. This would allow data to be obtained for elevations closer to ground. Ground-based measurements of temperature, pressure and relative humidity could be used as starting points for the standard lapse rate curves of temperature and pressure. The ground-based radio refractivity value could then be calculated and a linear interpolation between this value and the minimum altitude lidar return-signal could be used to fill in the lowest few meters of the radio refractivity profiles.

Obviously many modifications and variations of the invention are possible in light of the above teachings. It is therefore to be understood that within the scope of the appended claims the invention may be practiced otherwise than has been specifically described.

What is claimed is:

1. A method for predicting relative humidity within an atmosphere comprising the steps of:
   projecting a light beam into said atmosphere;
   receiving light backscattered from the atmosphere by said light beam;
   measuring the relative humidity of the atmosphere;
   deriving a relationship between said light backscattered from the atmosphere by said light beam and said relative humidity;
   projecting a subsequent light beam into said atmosphere;
   receiving light backscattered from the atmosphere by said subsequent light beam; and
   using said relationship to predict a subsequent relative humidity of the atmosphere based upon said light backscattered from the atmosphere by said subsequent light beam.

2. A method according to claim 1 in which said method is used to predict gradients in said subsequent relative humidity.

3. A method according to claim 2 in which said step of deriving said mathematical relationship includes using the method of least squares.

4. A method according to claim 3 in which said light beams are backscattered from aerosols in said atmosphere.

5. A method according to claim 4 in which said light beams are laser beams.

6. A method for calculating radio refractivity within an atmosphere comprising the steps of:
   projecting a light beam into said atmosphere;
   receiving light backscattered from the atmosphere by said light beam;
   measuring the relative humidity of the atmosphere;
   deriving a relationship between said light backscattered from the atmosphere by said light beam and said relative humidity;
   projecting a subsequent light beam into said atmosphere:
   receiving light backscattered from the atmosphere by said subsequent light beam;
   using said relationship to predict a subsequent relative humidity of the atmosphere based upon said light backscattered from the atmosphere by said subsequent light beam; and
   calculating said radio refractivity of the atmosphere using said predicted subsequent relative humidity.

7. The method of claim 6 further comprising the step of:
   deriving radio signal coverage from said calculated radio refractivity.

8. A method according to claim 7 in which said step of deriving said mathematical relationship includes using the method of least squares.

9. A method according to claim 6 in which said step of deriving said mathematical relationship includes using the method of least squares.

10. A method according to claim 9 in which said light beams are backscattered from aerosols in said atmosphere.

11. A method according to claim 10 in which said light beams are laser beams.

12. A method according to claim 11 in which said light beams are projected substantially vertically.

13. A method according to claim 12 in which said relative humidity is measured through use of a radiosonde.

14. A method according to claim 6 in which said steps of:
   projecting said light beam into said atmosphere;
   receiving light backscattered from the atmosphere by said light beam;
   projecting said subsequent light beam into said atmosphere; and receiving light backscattered from the atmosphere by said subsequent light beam;

are lidar performed.

15. The method of claim 14 further comprising the step of:

deriving radio signal coverage from said calculated radio refractivity.

16. A method for calculating radio refractivity within an atmosphere comprising the steps of:

projecting a light beam into said atmosphere;

receiving backscattered light of said light beam from a first set of locations in said atmosphere, each location within said first set of locations having a range and an altitude;

calculating said ranges and altitudes for each location of said first set of locations;

converting said backscattered light of said light beam into return-signals;

adjusting signal strength of said return-signals to compensate for range-induced signal loss, said return-signals thereby being converted into range-compensated return-signals;

obtaining a relative humidity measurement at each of said altitudes corresponding to said locations within said first set of locations;

matching said relative humidity measurements with said range-compensated return-signals for each of said altitudes corresponding to said locations within said first set of locations;

deriving a mathematical relationship between said matched relative humidity measurements and said range-compensated return-signals;

projecting a subsequent light beam into said atmosphere;

receiving backscattered light of said subsequent light beam from a second set of locations in said atmosphere, each location within said second set of locations having a range and an altitude;

calculating said ranges and altitudes for each location of said second set of locations;

converting said backscattered light of said subsequent light beam into additional return-signals;

adjusting signal strength of said additional return-signals to compensate for said range induced signal loss, said additional return-signals thereby being converted into additional range-compensated return-signals;

using said mathematical relationship to derive predicted relative humidity at said altitudes corresponding to said locations within said second set of locations, from said additional range-compensated return-signals corresponding to said altitudes that correspond to said locations within said second set of locations; and calculating radio refractivity for each of said altitudes corresponding to said locations within said second set of locations based upon said predicted relative humidity, and temperature and pressure calculated for said altitudes corresponding to said locations within said second set of locations from standard temperature and pressure lapse rates referenced to surface conditions.

17. The method of claim 16 further comprising the step of:

deriving radio signal coverage from said calculated radio refractivity.

18. A method according to claim 17 in which said step of deriving said mathematical relationship includes using the method of least squares.

19. A method according to claim 16 in which said step of deriving said mathematical relationship includes using the method of least squares.

20. A method according to claim 19 in which said light beams are backscattered from aerosols in said atmosphere.

21. A method according to claim 20 in which said light beams are laser beam.

22. A method according to claim 21 in which said return signals are of magnitudes dependent upon energy of said backscattered light of said light beam and in which said additional return signals are of magnitudes dependent upon energy of said backscattered light of said subsequent light beam.

23. The method of claim 22 in which said ranges corresponding to said first set of locations are based upon time elapsed from said projecting of said light beam to said receiving of said backscattering of said light beam and said ranges corresponding to said second set of locations are based upon time elapsed from said projecting of said subsequent light beam to said receiving of said backscattering of said subsequent light beam.

24. The method of claim 23 in which said backscattered light from said light beam and said backscattered light from said subsequent light beam are received at a sampling frequency of approximately 20 megahertz.

25. A method according to claim 24 in which said light beams are projected substantially vertically.

26. A method according to claim 25 in which said relative humidity is measured through use of a radiosonde.

* * * * *